United States Patent [19]

Harry et al.

[11] Patent Number: 5,316,792
[45] Date of Patent: May 31, 1994

[54] METHOD AND PROCESS FOR THE STABILIZATION OF RESIN COATED PARTICULATES

[75] Inventors: David N. Harry; Sharif Sharif, both of Midland, Tex.

[73] Assignee: Benchmark Research and Technology, Inc., Midland, Tex.

[21] Appl. No.: 71,483

[22] Filed: Jun. 4, 1993

Related U.S. Application Data

[62] Division of Ser. No. 924,488, Aug. 4, 1992.

[51] Int. Cl.$^5$ ............... B05D 7/00; E21B 43/26; C09K 3/00
[52] U.S. Cl. .................. 427/221; 116/280; 252/8.551
[58] Field of Search ............ 427/221; 166/280; 252/8.551

[56] References Cited

U.S. PATENT DOCUMENTS

| | | | |
|---|---|---|---|
| 4,585,064 | 4/1986 | Graham | 166/280 |
| 4,732,920 | 3/1988 | Graham | 523/145 |
| 4,785,884 | 11/1988 | Armbruster | 166/280 |
| 4,888,240 | 12/1989 | Graham et al. | 428/403 |

*Primary Examiner*—Shrive Beck
*Assistant Examiner*—David M. Maiorana
*Attorney, Agent, or Firm*—Donald R. Comuzzi; Christopher L. Makay

[57] ABSTRACT

The present invention relates to resin coated particulates, the process of forming the particulates, and the particulates, utilization in petroleum well completions. More particularly, the present invention comprises the resin coated particulates and the process whereby the high strength particulate substrates are coated with a heat curable resin which is reacted with a formaldehyde source-metal compound (FS-MC) complex. The resultant resin coated particulates are less reactive or interactive with the fluids employed to convey those particulates during petroleum well completion operations.

15 Claims, No Drawings

METHOD AND PROCESS FOR THE STABILIZATION OF RESIN COATED PARTICULATES

This application is a divisional application of copending application. Ser. No. 07/924,488 filed on Aug. 4, 1992.

BACKGROUND OF THE INVENTION

The present invention relates to resin coated particulates used in petroleum well completions, and the process through which uncoated particulates employed as substrates are resin coated. More particularly, but not by way of limitation, the present invention comprises resin coated particulates which are less reactive or interactive with the fluids utilized to convey the particulates during petroleum well completions.

It is well known in the petroleum well completions and servicing industry that phenol-formaldehydes and related resins ("plastics") are used to consolidate otherwise incompetent formations, to coat particulates for use in gravel-packing, and to coat particulates for use as proppants in hydraulic fracturing operations.

Formation consolidation techniques are well completion practices used to stabilize wellbores so that these wellbores may be prevented from collapsing. Collapsed wellbores cause decline in the production of hydrocarbons, or a reduction in the quantity of fluids injected in secondary and tertiary recovery operations. Injected fluids are used to displace hydrocarbons towards producing wellbores. By coating the formation particulates with plastics, the formation's particulates can be welded together to create a porous "casing", suitable for facilitating the flow of fluids to or from the wellbore, whichever is preferred.

Gravel packing operations are also regarded as well completion practices in which specially sized particulates are placed in the wellbore, generally in the annular region, between the formation and a wire wrapped porous mandrel. The specially sized particulates, placed in the annular region, are sized to prevent the production of formation solids during the production of formation fluids. The wire wrapped porous mandrel is used to prevent the migration of the specially sized particulates into the subsurface and surface production equipment while allowing the production of hydrocarbons. The specially sized particulates may be "plastic" coated to enhance their performance.

Hydraulic fracturing operations also utilize "plastic" coated particulates, normally employed as proppants, to enhance and maintain the relative permeability of the hydraulically induced fracture with respect to the natural permeability of the hydrocarbon bearing formation. Hydraulic fracturing operations may be considered a well completion method as well as a remedial production operation method. Formation fracturing is used to enhance the recovery rate of hydrocarbons or the fluid injection rates in secondary and tertiary recovery operations. In hydraulic fracturing operations, highly viscous fluids are used to initiate and propagate fractures in hydrocarbon bearing subterranean formations. These "frac fluids" are also used to convey the particulates which will be used to "prop" the fracture open once the fracturing fluid has lost it high viscosity and has been recovered via the wellbore. The "frac fluid" is recovered in order to make space available in the newly formed highly permeable "proppant pack" so that the production of hydrocarbons or the injection of hydrocarbon displacing fluids, whichever is preferred, is enhanced. Examples of particulates used as proppants in various hydraulic fracturing operations include sand, glass beads, ceramics, and nut shells. Each particulate has been "plastic" coated at one time or another to enhance its performance.

Patented works which acknowledge the use of plastics to coat particulates in formation consolidation, gravel-packing, and hydraulic fracturing operations include, but are certainly not limited to:

U.S. Pat. No. 2,378,817, issued on Jun. 19, 1945 to Wrightsman, et al., which discloses the use of resins, particularly phenol-formaldehyde resins to coat formation sands in hydrocarbon producing zones to prevent wellbore collapse;

U.S. Pat. No. 3,026,938, issued on Mar. 3, 1962 to Huitt, et al., which discloses the use of non-adherent proppants coated with phenol-formaldehyde resins, as well as numerous other materials for use in hydraulic fracturing operations;

U.S. Pat. Nos. 3,176,767 and 3,176,768, both issued on Apr. 6, 1965 to Brandt, et al., which disclose a method of consolidating incompetent earth formations in oil wells by coating formation sands, silts, and clays with thermosetting resins;

U.S. Pat. No. 3,237,693, issued on Mar. 1, 1966 to Huitt, et al., which discloses a method of fracturing a formation displacing novel propping agents, comprising an inert solid particle coated with a dissolvable coating, down a well and into a fracture, thereby enhancing proppant pack conductivity;

U.S. Pat. No. 3,254,717, issued on Jun. 7, 1966 to Huitt, et al., which discloses a method of impregnating seeds for use as propping agents in hydraulic fracturing operations with plastics, including phenol-formaldehyde, urea-formaldehyde, and phenolfurfural resins;

U.S. Pat. No. 3,376,930, issued on Apr. 9, 1968 to Kiel, et al., which discloses a metal-powder coated particulate useful as a proppant in hydraulic fracturing operations.

U.S. Pat. No. 3,393,736, issued on Jul. 23, 1968 to Goodwin, which discloses a well completion method whereby a casing set in an incompetent fluid bearing formation is cut, and the incompetent formation solids removed to create a cavity which is filled with a fusible thermosetting resin coated particulate set into a permeable coherent mass;.

U.S. Pat. No. 3,404,735, issued on Oct. 10, 1968 to Young, et al., which discloses a method of coating sands for gravel-packing operations using, among other things, coatings comprised of phenolformaldehyde and furfuryl alcohol resins, and silanes to provide superior consolidations;

U.S. Pat. No. 3,419,073, issued on Dec. 31, 1968 to Brooks, which discloses a formation consolidation method using a variety of plastics mixed with silanes used to enhance the bond strength between the resin and the particulate;

U.S. Pat. No. 3,492,147, issued on Jan. 27, 1970 to Young, et al., which discloses the production of particulate solids used in hydraulic fracturing which are coated with an infusible resin incorporating radioactive materials employed as tracers;

U.S. Pat. No. 3,625,287, issued on Dec. 7, 1971 to Young, which discloses a plastic coated sand using silanes with epoxies and phenol-formaldehyde resins to enhance the strength and ability of the disclosed formation sands;

U.S. Pat. No. 3,659,651, issued on May 12, 1972 to Graham, which discloses the use of reinforced plastic pellets as proppants useful in hydraulic fracturing operations;

U.S. Pat. No. 3,760,880, issued on Sep. 25, 1973 to Dollarhide, which discloses formation consolidation compositions employing particulates (e.g. sand, glass beads, particulate metals, etc.) coated with any unset resin, which is formed by the reaction of an aldehyde and a low molecular weight hydroxyaryl compound (e.g. phenol-formaldehyde), and a coupling agent (e.g. certain silanes) to enhance the bond between the particulate and the resin;

U.S. Pat. No. 3,780,807, issued on Dec. 25, 1973 to Graham, et al., which discloses the use of resins and silanes to produce novel gravel packing compositions which are comprised of coated sands bridged together to form a bond capable of withstanding relatively high differential pressures;

U.S. Pat. No. 3,929,191, issued on Dec. 30, 1975 to Graham, et al., which discloses the manufacture and use of resin coated proppants for hydraulic fracturing operations, where these products might be manufactured using a cold solvent process, or a hot, melt process using a blend of one-step resole and two-step novolac resins;

U.S. Pat. No. 3,935,339, issued on Jan. 27, 1976 to Cooke, which discloses a method of coating particulate materials, such as silica sand, glass beads, seeds, and metal particulates, with a liquid thermosetting epoxy resin creating a high compressive strength material suitable for use in hydraulic fracturing operations;

U.S. Pat. No. 4,073,343, issued on Feb. 14, 1978 to Harnsberger, which discloses a method of and composition for the treatment of unconsolidated sandy formations in which formation sands are coated with a fusible material serving to prevent or reduce materially the flow of unconsolidated sandy particles to the wellbore while permitting the flow of desirable formation fluids at a substantially unimpaired rate;

U.S. Pat. No. 4,336,842, issued on Jun. 29, 1982 to Graham, et al. and later disclaimed, which discloses the use of an "activator" to reduce the fusion temperature of the resin on coated proppants, making these materials suitable for use in low temperature hydraulic fracturing operations;

U.S. Pat. No. 4,413,931, issued on Nov. 8, 1983 to McDonald, which discloses a coating for particulates, used in hydraulic fracturing, employing a two-step, curable, novolac-type phenolic resin having a majority of o-p' dimers;

U.S. Pat. No. 4,439,489, issued on Mar. 27, 1984 to Johnson, et al., which discloses a process for the preparation of coated particulates, used as proppants, whereby lubricants such as silicone liquid, mineral oil, or a bis-stearamide of a diamine, are used;

U.S. Pat. No. 4,443,347, issued on Apr. 17, 1984 to Underdown, et al., which discloses a pre-cured charge useful in hydraulic fracturing;

U.S. Pat. No. 4,518,039, issued on May 21, 1985 to Graham, et al., which discloses a method for treating subterranean formations with a heat curable particle produced by including coupling agents, such as organofunctional silanes, on the "high strength centers" and in the resin coatings;

U.S. Pat. No. 4,527,627, issued on Jul. 9, 1985 to Graham, et al., which discloses a method of acidizing fractures propped with self-consolidating resin coated particles;

U.S. Pat. No. 4,553,596, issued on Nov. 19, 1985 to Graham, et al., which discloses a method of preventing the collapse of perforation tunnels extending from a wellbore into a subterranean formation by filling the tunnels with selfconsolidating resin coated particles and curing the resin coated particles into a permeable matrix;

U.S. Pat. No. 4,564,459, issued on Jan. 14, 1986 to Underdown, et al., which is an extension of U.S. Pat. No. 4,443,347 and discloses a pre-cured proppant charge useful in hydraulic fracturing;

U.S. Pat. No. 4,581,253, issued on Apr. 8, 1986 to Evans, et al., which discloses a process for preparing a pre-cured proppant charge useful in hydraulic fracturing;

U.S. Pat. No. 4,585,064, issued on Apr. 29, 1986 to Graham, et al., which discloses an improved resin coated particle suitable for use as a hydraulic fracturing proppant comprising a particulate substrate, a substantially cured inner resin coating, and a heat curable outer resin coating;

U.S. Pat. No. 4,597,991, issued on Jul. 1, 1986 to Graham, et al., which discloses a method for producing an improved particulate material for use in fracturing as a proppant and/or as a fluid loss agent and as a screening material in gravel packing comprised of heat curable particulates capable of forming a cohesive mass, the particulates comprised of a high strength center, a coupling agent chemically bound to the center with a heat curable resin coated over the center, where the coupling agents are added to both the centers and the resin;

U.S. Pat. No. 4,664,819, issued on May 12, 1987 to Glaze, et al., which is an extension of U.S. Pat. No. 4,565,459 and U.S. Pat. No. 4,443,347 and discloses a pre-cured proppant charge useful in hydraulic fracturing;

U.S Pat. No. 4,677,187, issued on Jun. 30, 1987 to Armbruster, et al., which discloses the preparation of furfuryl alcohol-formaldehyde resins by using a water-soluble multivalent salt as the catalyst, thereby eliminating the use of an acid catalyst and the necessary attention it requires, where the useful water soluble multivalent metal salt catalysts include the multivalent ions of manganese, zinc, cadmium, magnesium, cobalt, nickel, copper, tin, iron, lead, and calcium, where the preferred catalysts are zinc acetate, lead acetate, or mixtures thereof;

U.S. Pat. No. 4,694,905, issued on Sep. 22, 1987 to Armbruster, which discloses a precured coated particle where the particles are individually coated with a cured combination of phenolic/furan resin or furan resin to form a precured resin coating on the particles, thereby substantially improving the chemical resistance of the particles over one having a straight phenolic precured coating;

U.S. Pat. No. 4,694,905 (a second embodiment), issued on Sep. 22, 1987 to Armbruster, which discloses the use of multiple resin coatings on a particulate to form a final layered coating containing the desired amount of cured resin, thereby producing a final product having a smoother, more uniform surface than particulate material having its entire resin coating applied in a single operation;

U.S. Pat. No. 4,717,594, issued on Jan. 5, 1988 to Graham, et al., which discloses an improved resin coated particle comprising a particulate substrate, a substantially cured inner resin and a heat curable outer resin coating, where the particles are suitable for use in hydraulic fracturing operations;

U.S. Pat. No. 4,722,991, issued on Feb. 2, 1988 to Armbruster, which discloses a terpolymer prepared from phenol, furfuryl alcohol, and formaldehyde wherein a substantial amount of the furfuryl alcohol is catalytically reacted by means of a water soluble multivalent metal salt catalyst, and further wherein the reaction is carried out under essentially hydrous conditions;

U.S. Pat. No. 4,732,920, issued on Mar. 22, 1988 to Graham, et al., which discloses a particulate suitable for use in certain well completion and well stimulation operations, where the coupling agent is added to the "high strength centers" and the resin;

U.S. Pat. No. 4,785,884, issued on Nov. 22, 1988 to Armbruster, which discloses the use of an acidic catalyst in a solvent system to cure particulate materials coated with solid thermosetting resins that can consolidate and cure at temperatures below about 130° F. making it suitable as a fusible proppant in low temperature hydraulic fracturing operations;

U.S. Pat. No. 4,848,470, issued on Jul. 18, 1988 to Korpics, which discloses an improved process for removing particulate material bonded together by cured phenolic resins from a wellbore using solvents containing N-N-dimethylformamide, N-methyl-2 pyrrolidone, or mixtures;

U.S. Pat. No. 4,888,240, issued on Dec. 19, 1989 to Graham, et al., which discloses a dual-coated proppant suitable for use in hydraulic fracturing operations comprising a particulate substrate, a substantially cured inner resin coating, and a fusible curable outer resin coating;

U.S. Pat. No. 4,932,714, issued on May 8, 1990 to Gibb, et al., which discloses an epoxy coated ceramic particulate useful in fracturing and gravel packing operations.

In September 1990, Nimerick, McConnell, and Samuelson presented a paper (SPE 20639) at the 65th Annual Technical Conference and Exhibition of the Society of Petroleum Engineers in which the authors address the "Compatibility of Resin-Coated Proppants (RCP) With Crosslinked Fracturing Fluids". The authors state that "some job problems have been attributed to the incompatibility of some water-base crosslinked fracturing fluids with the curable resin-coated proppant." The authors, in presenting "a study of the effects of precured and curable RCP on water-base crosslinked fracturing fluids" found that rheological properties, crosslinker concentration/distribution, and the effect on the proppant's physical properties are critical parameters in evaluating the compatibility of the RCP with crosslinked fracturing fluids. The authors principally worked with only curable RCP's (believed to be the worst case) and found that the addition of curable RCP's to fracturing fluids could delay crosslinking times by as much as 100% and that this in turn significantly and often detrimentally impacts fluid rheology and, therefore, performance.

Also, in September, 1990, Norman, Terracina, McCabe, and Nguyen presented a paper (SPE 20640) in which the authors address the "Application of Curable Resin-Coated Proppant". The authors found that by increasing the amount of crosslinker, rheology deficiencies could be corrected. If the findings of the previous paper (SPE 20639) are indicative of the amount of crosslinker lost, as much as 30% additional crosslinker might be necessary to correct the deficiency. The authors also found no rheological impact on crosslinked fracturing fluids with the addition of curable RCP's, although these findings are inconsistent with those of others in the industry. The authors did encounter interferences with fluid "breaker" additives with the addition of RCP's, where the "breakers" are oxidative persulfate type breakers.

David A. Stiles reported that curable resin coated particulates significantly and detrimentally affected the performance of fracturing fluids in his "Compatibility of Curable Resin-Coated Proppants With Breakers in Crosslinked Fracturing Fluids" at the 38th Annual Southwestern Petroleum Short Course at Lubbock, Tex.

In April, 1992, Michael A. Smith reported, at the 39th Annual Southwestern Petroleum Short Course at Lubbock, Tex. that "new resin chemistry and coating technology has increased the areas of application for resin coated proppants. Curable resins have been changed to reduce fluids interaction which results in improved compatibility and retained conductivity. The changes in curable proppants have been related to coating technology and resin chemistry. In addition to improved fluid compatibility, the changes in these coatings reduce the risk of consolidation in highly deviated or horizontal wells. Recent developments in precured resin coated proppants place these materials in the intermediate strength range of light weight ceramics but with better economics."

Smith further states that current practice is to divide curable coatings into "three general groups, curable, dual coated, and partially cured coatings." In all cases, Smith reports that "furan resin coated sand has extended the temperature and pressure application range of pre-cured resin coated sand into the ranges previously reserved for low density ceramics."

In only one place (FIG. 6), however, does Smith really address the issue of interaction between the resin coating and constituents that comprise the fracturing fluid. In this case, the furan precured particulates actually show a higher interaction with the ammonium persulfate breaker than the corresponding phenolformaldehyde resins manufactured by the company with whom Smith is employed. All Smith's company's materials show less resin-fluid interaction than those reported by his competitor, indicating that while the products Smith represents might be superior to those of his competitor, the paucity of data addressing resin-fluid interaction, and the results that are reported give evidence that the problem of resin-fluid interactions is not resolved.

As early as 1983, McDonald reported in U.S. Pat. No. 4,413,931 that "it has been thought that the reduced strength of the conventional novolac resin-bonded sand was caused by the loss of polymerization catalyst hexamethylenetetramine (HMTA) into the formation before the resin could cure." He adds that "increasing the amount of hexa in the uncured novolac has not, however, led to significant increases in compressive strength." It was McDonald's invention to define and identify a 2-step novolac type resin with the compressive strength equal to that of the one-step resole-type resins by using a novolac resin having a majority of o-p' dimers.

Additionally, although phenol-formaldehyde resins are typically used as the material of choice to coat particulate used as proppants, Acme Resin has found that the use of furan resins offers some relief as a means of limiting the reaction between the particulate coating and fracturing fluid additives. The use of furans, however, has not eliminated the coating-fluid interaction to the satisfaction of users.

In summary, the current practice in the oil field pumping services and production industry of using resin coated particulate to enhance the conductivity of fractures in hydrocarbon bearing formations has met with limited success due to the reaction of the resin coating with the additives which comprise the hydraulic fracturing fluid. More specifically, it has been found that polymer crosslinking agents, generally referred to as crosslinkers, and polymer degradation additives, generally referred to as breakers, especially those breakers regarded as "oxidative" by those skilled in the art, are the fracturing fluid additives most susceptible to reaction with the resin coatings on particulates.

It, therefore, has been found, as reported in the published works of early 1990's, that efforts to stabilize the "plastic" coats on resin coated proppants to such a degree as to minimize the interaction between the constituents comprising the resin coating and the constituents comprising the fracturing fluid have failed.

Accordingly, the present invention has been developed to provide a resin coated particulate which is less reactive or unreactive with the fluids employed to convey the particulates during well completion operations.

SUMMARY OF THE INVENTION

During the study of the resin coating process, it has come to the attention of the inventors that hexamethylenetetramine (HMTA) is integral in the manufacture of 2-step, novolac resins. In work related to the development of transition metal chelates, particularly zirconium chelates for use as polymer crosslinking agents in hydraulic fracturing fluids, the inventors learned of the development in 1933 of zirconium citrate hexamethylenetetramine (zirc citrate HMTA). The concurrent discovery by the inventors of the use of HMTA in resins, the metal chelated HMTA (zirc citrate HMTA), and the interaction problem between resin coatings and fracturing fluids led the inventors to evaluate various metal chelated HMTA compositions for use as resin additives in an attempt to reduce the coating-fluid interaction.

The inventors have evaluated the zirc lactate HMTA, substituting it for "neat" HMTA typically employed in the manufacture of novolacs. Upon evaluation, the inventors found that the coating-fluid interaction was less than that found with coatings not employing the invention. Additionally, the inventors found that sufficient zirc lactate HMTA could be employed so that the need for crosslinking agent in the fracturing fluid was all but eliminated.

While the chemistry of the reaction between the zirc lactate HMTA and the resin to enhance the fluid stability of coated materials is not fully understood, it is believed that those reaction sites on the resin coating formerly interacting with the fracturing fluid additives are now occupied by zirconium lactate. Additionally, although the chemistry of the reaction between the zirc lactate HMTA coating and the fracturing fluid is not fully understood, it is believed that excessive zirc lactate occupying reaction sites on the resin coating serves as a source for crosslinking materials suitable for increasing the viscosity of polymer solutions employed as fracturing fluids.

Furthermore, even though the chemistry of the reaction between the zirc lactate HMTA as it is used in the invention, and the "breakers," particularly "oxidative" breakers, used in fracturing fluids is not fully understood, it is believed that the zirc lactate HMTA renders surface cites formerly reactive when only HMTA is employed, preferentially unreactive to the action of oxidative breakers so that these breakers preferentially react with the polymer solution as originally intended.

Thus, it is an object of the present invention to provide a resin coating and method of applying the resin coating to particulates used as proppants in hydraulic fracturing operations and as a gravel in gravel packed well completions which minimize the interaction between the constituents comprising the resin coating and the constituents comprising the fracturing fluid.

It is a further object of the present invention to provide a resin coated particulate that may serve as a substrate or agents such as formaldehyde source-metal compound (FS-MC) complexes (e.g. zirc lactate HMTA) suitable to affect crosslinking of polymer solutions employed in hydraulic fracturing or gravel packing operations.

It is still a further object of the present invention that the aforementioned crosslinking agents may be applied to the surface of particulates which are not already resin coated, such as to the surface of silica sand, bauxite, and other particulates suitable as proppants used in hydraulic fracturing operations or gravel used in gravel packed well completions.

It is still another object of the present invention to affix polymer crosslinking agents other than FS-MC complexes to the particulates in order to affect crosslinking.

Still other features and advantages of the present invention will become evident to those skilled in the art in light of the following.

DETAILED DESCRIPTION OF THE PREFERRED EMBODIMENT

The present invention comprises resin coated particulates, the process of coating the particulates, and the particulates' utilization as proppants and/or as crosslinker-carrying agents in hydraulic fracturing operations and as a gravel and/or crosslinker-carrying agents in gravel packed well completions.

The resin coated particulates of the preferred embodiment of the present invention, which are made according to one of the processes described herein, comprise high strength particulate substrates coated with a heat curable resin reacted with a formaldehyde source-metal compound (FS-MC) complex.

The preferred process for forming the high strength resin coated particulates of the present invention will now be described. First, high strength particulate substrates (described herein) are heated using a conventional heater, such as that offered by Shalco Systems Division of the Roberts Sinto Corp. of Lansing, Mich., to a temperature above the melting point of the employed resin. The resin utilized may be any one of the heat curable resins described herein. Second, the heated particulates are transferred to a pugmill or a similar mixing device. Third, the resin is added to the heated substrates, and both are mixed in the pugmill or similar mixing device until the resin is dispersed over the surface of the substrates. Fourth, a FS-MC complex is added to the resin coated substrates contained in the pugmill or similar mixing device, where it reacts with the resin to make resin coated particulates that are less reactive or unreactive with fluids employed to hydraulically fracture subterranean formations or with fluids employed as completion fluids in gravel packing operations. The FS-MC complex may be any one or combination of FS-MC complexes described herein. Finally, the finished coated particulates are allowed to cool to below 140° F. where they are then packaged for commercial use.

In a second embodiment of the process according to the present invention, the free-flowing high strength resin coated particulates are formed as follows. First, a thermosetting resin or a blend of thermosetting and thermoplastic resins (described herein) are manufactured to contain an FS-MC complex (described herein) using any conventional resin manufacturing process. Second, high strength particulate substrates (described herein) are heated, using any conventional heater as described above, to a temperature above the melting point of the resin or resins containing the FS-MC complex. Third, the heated particulates are transferred to a pugmill or similar mixer. Fourth, the resin or resins containing the FS-MC complex are added to the substrates, and both are mixed in the pugmill or similar mixer until the resin or resins containing the FS-MC complex are dispersed over the surface of the substrates. Finally, the resin coated particulates are cooled to below 140° F. before packing for commercial use.

In a third embodiment of the process according to the present invention, the high strength resin coated particulates are formed as follows. In this embodiment the resin (described herein) utilized is a thermosetting resin or a blend of thermosetting resins. First, high strength particulate substrates (described herein) are heated, using the conventional heater described above, to a temperature above the melting point of the thermosetting resin. Second, the high strength particulate substrates are transferred into a pugmill or similar mixing device. Third, the thermosetting resin or resins are added to the pugmill and mixed with the heated substrates. Concurrently or within approximately the amount of time required for the employed resin or resins to set, any one or combination of the FS-MC complexes described herein is added to the heated substrates and thermosetting resin or resins. Fourth, the combination of the thermosetting resin or resins, particulate substrates, and FS-MC complex is mixed until all the additives are dispersed over the surface of the particulate substrates. Finally, the coated particulates are cooled to below 140° F. before packing for shipment.

Notwithstanding the preceding embodiments disclosing the processes for forming the resin coated particulates of the present invention, those skilled in the art of coating particulates with thermoplastic resins, thermosetting resins, and blends of thermoplastic and thermosetting resins are familiar with the addition of silanes, lubricants, dust suppressants, etc. to enhance the performance of the resin coats and the coated particulates. The present invention is likewise enhanced by the addition of silanes or other coupling agents to either the high strength particulate substrates or to the resin or to both. Furthermore, the addition of lubricants and dust suppressants enhances the present invention, and the inclusion of these additives should not detract from the benefits wrought by the present invention.

The high strength particulate substrates, resins, and formaldehyde source-metal compound (FS-MC) complexes suitable to form the resin coated particulates according to the present invention will be described in the following paragraphs. High strength materials suitable for use as the particulate substrates include, but are certainly not limited to, silica sand, glass beads, sintered bauxite, ceramics, or metal oxides, or other mineral particles. High strength substrates previously coated with resins where the resin coating is curable, substantially cured, or precured are also suitable for the purposes of the present invention. The high strength materials suitable for use as the particulate have a mesh size between approximately 6 and 200.

Heat curable resins suitable for forming the particulate substrates coating comprise either thermoplastic resins or combinations of both thermoplastic and thermosetting resins. Specifically, the resins include, but are certainly not limited to, phenolic, amino, polyester, polyether, polyurethane, polyamide, epoxide, or silicone resins, or mixtures thereof. In a second embodiment of the present invention, a thermosetting resin could be used as the heat curable resin reacted with the formaldehyde source-metal compound (FS-MC) complex. The heat curable resins employed in the present invention are manufactured using conventional processes, and may be obtained from a variety of resin suppliers, such as Georgia Pacific, OxyChem, or Acme Resin.

The formaldehyde source suitable for forming the FS-MC complex and reacting with the heat curable thermoplastic and thermosetting resins or blends thereof comprises hexamethylenetetramine (HMTA), formaldehyde, paraformaldehyde, or trioxane, or combinations thereof. Further, it is to be understood that any other cyclic formals could be employed as the formaldehyde source.

Metal compounds suitable for forming the FS-MC complex and reacting with the heat curable resin comprise boron in a compound form having a pH between approximately 6.5 and 11, aluminum in compound form, or transition metals in a compound form where the metal ion exhibits a valency of $+2$, $+3$, or $+4$, or any combinations thereof. The transition metals include, but are certainly not limited to, cerium, chromium, cobalt, copper, hafnium, iron, manganese, molybdenum, nickel, scandium, titanium, tungsten, zinc, or zirconium, or combinations thereof.

A first group of metal compounds, hereinafter referred to as Group 1, suitable for forming the FS-MC complex may be metal chelates of the previously listed metals where the chelating agent is a salt of an alpha-hydroxycarboxylic acid. The alpha-hydroxycarboxylic acid salt is formed from a reaction between an alpha-hydroxycarboxylic acid and certain bases. Alpha-hydroxycarboxylic acids suitable to the purposes of the present invention include, but certainly are not limited to, citric acid, glycolic acid, gluconic acid, lactic acid, malic acid, mandelic acid, mucic acid, saccharic acid, or tartaric acid, or mixtures thereof. Bases suitable for reaction with the alpha-hydroxycarboxylic acid to form the alpha-hydroxycarboxylic acid salt include, but are certainly not limited to, hexamethylenetetramine, or mixtures of hexamethylenetetramine and alkali metals of cesium, lithium, potassium, or sodium, or mixtures of hexamethylenetetramine and ammonia, or mixtures of hexamethylenetetramine and any water soluble amine or amine derivative, or a mixture of any thereof. An example of a Group 1 metal compound suitable for forming the FS-MC complex is zirc lactate HMTA which we believe is better described as hexamethylenetetramine (HMTA) zirconium lactate.

A second group of metal compounds suitable for forming the FS-MC complex, hereinafter referred to as Group 2, may be metal chelates of the previously listed metals of cerium, chromium, cobalt, copper, hafnium, iron, manganese, molybdenum, nickel, scandium, titanium, tungsten, zinc, zirconium or combinations thereof where the chelating agent is a diol or polyol. Polyols suitable to the purposes of the present invention include, but are certainly not limited to, glycerol, sorbitol, or mannitol, or mixtures thereof. An example of a Group 2 metal compound suitable for forming the FS-MC complex is HMTA zirconium glycerate.

A third group of metal compounds, hereinafter referred to as Group 3, suitable for forming the FS-MC complex may be a metal compound wherein the metal is a transition metal having a valence of $+2$, $+3$, or $+4$ wherein the anion is a carbonate, hydroxide, oxide, phosphate, or sulfate, or combinations thereof. An example of a Group 3 metal compound suitable for forming the FS-MC complex is HMTA zirconium hydroxide.

A fourth group of metal compounds, hereinafter referred to as Group 4, suitable for forming the FS-MC complex may be a metal compound of aluminum, where the aluminum exhibits a valence of $+3$, and wherein the anion is a carbonate, hydroxide, oxide, phosphate, or sulfate, or combinations thereof. An example of a Group 4 metal compound suitable for forming the FS-MC complex is HMTA aluminum hydroxide.

A fifth group of metal compounds, hereinafter referred to as Group 5, suitable for forming the FS-MC complex may be basic metal halides, except for fluoride, where the metal compound is a basic halide of aluminum, or previously listed transition metals exhibiting a valence of $+2$, $+3$, or $+4$, or mixtures thereof. An example of a Group 5 metal compound suitable for forming the FS-MC complex is HMTA zirconium chloride.

Metal compounds suitable for forming the FS-MC complex utilized in the present invention may be a mixture of Group 1, Group 2, Group 3, Group 4, or Group 5 metal compounds, or any mixture thereof. An example of a suitable mixture of metal compounds to form an FS-MC complex would be a 1:1 mixture of HMTA zirconium lactate (Group 1) and HMTA zirconium hydroxide (Group 3).

To form the above FS-MC complexes, the compounding anion to metal cation ratio may be from approximately 0.1:1 to 20:1. That ratio applies to all the metal to compound ratios used to make the FS-MC complexes described in Groups 1–5 or their combinations. The preceding FS-MC complexes may be manufactured according to any of several well known processes such as that disclosed in U.S. Pat. No. 1,905,848, issued on Apr. 25, 1933 to Gelarie or may be obtained from Zirconium Technology Corporation of Midland, Tex. In addition, the FS-MC complexes may be manufactured and used in both powder and solution form.

For the purposes of disclosure and to aid in the understanding of the invention, a specific example of the preferred process employing specific particulate substrates, resin, and FS-MC complex will be described below. The composition and in this example a pilot coater process to manufacture the resin coated particulates according to the preferred embodiment of the present invention comprise the following steps. First, ten pounds of sand, more precisely Badger Mining's 2365, are heated to approximately 380° F. in a heater. Second, the heated particulates are transferred to a muller. Third, 90 grams of a novolac resin, more precisely, OxyChem's Durez 29243 which is a phenolformaldehyde novolac resin containing a coupling agent, are added and allowed to mull with the sand for approximately 90 seconds. Fourth, 33 grams of the FS-MC complex, which in this example is 0.8% by weight ZrO, active solution of hexamethylenetetramine zirconium lactate available from Zirconium Technology Corporation of Midland, Tex., are added over a period of approximately five seconds. Fifth, the resultant mixture is allowed to continue mulling for approximately fifteen seconds. Sixth, at the end of the 15 seconds, 100 grams of water is added as a quench over approximately five seconds, followed by cool air for approximately one minute to lower the temperature of the coated sand so that it might be handled, if necessary. Seventh, the mixture is allowed to continue mulling for approximately forty seconds, at which time, approximately 0.75 ml of vegetable oil is added as a dust suppressant. Finally, twenty-five seconds after the addition of the oil, the coated sand is dumped from the muller and allowed to cool to below 140° F. before use.

Crosslinking time tests were conducted to evaluate the degree of interference caused by the presence of resin coated proppants in a typical hydraulic fracturing fluid. The fracturing fluid which comprised a forty pound per 1000 gallon equivalent hydroxypropyl guar (HPG) polymer solution at pH 9.5 was crosslinked with a delayed zirconium crosslinker provided by Zirconium Technology Corporation of Midland, Tex. The process of generating fracturing fluids of this nature is well-known to those skilled in the art. Discussions of the art may be found in the hydraulic fracturing references of:

Gidley, John L., Editor-in-Chief; *Recent Advances in Hydraulic Fracturing*; Society of Petroleum Engineers, Richardson, Tex. (1989); and Economides, Michael J. and Nolte, Kenneth G., Editors; *Reservoir Stimulation* 2d ed.; Prentice Hall, Englewood Cliffs, N.J. (1989).

For these tests, crosslinking was defined as the time required for the vortex, generated by mixing the fluid-proppant slurry in a Waring Blender, to close and cap. Again, the process of measuring crosslinking time in this fashion is well know to those skilled in the art as described in the above references.

TABLE 1

|  | SAND | RCS W/ INVENTION | RCS W/O INVENTION |
| --- | --- | --- | --- |
| TEST NO. 1 | 120 sec. | 140 sec. | 220 sec. |
| TEST NO. 2 | 140 sec. | 135 sec. | 205 sec. |
| TEST NO. 3 | 130 sec. | 160 sec. |  |
| TEST NO. 4 |  | 160 sec. |  |
| TEST NO. 5 |  | 145 sec. |  |
| X | 130 sec. | 148 sec. | 212 sec. |

Referring to TABLE 1, the crosslinking times of the present invention are considerably lower than the crosslinking times of resin coated sand not employing the present invention. Examples of resin coated sands not employing the present invention include all commercially available resin coated sands such as those marketed by ACME Resin, Santrol, or more specifically, the resin coated sands disclosed in U.S. Pat. Nos. 4,585,064; 4,732,920; 4,888,240; 4,722,991; and 4,785,884. Additionally, the data listed in Table 1, column 3, was obtained in tests using a resin coated sand produced by Benchmark Research and Technology, Inc., which was not coated with the present invention (i.e., the reaction product of a heat curable resin and a FS-MC complex). In fact, the crosslinking times of the present invention approach the crosslinking times of uncoated sand. The inventors believe that producing crosslink times in hydraulic fracturing fluids containing resin coated particulates which are closer to those crosslink times realized when uncoated particulates are used represents a significant improvement. Specifically, resin coated particulates incorporating the present invention produce crosslink times with a difference of less than fifteen percent from the crosslink times in slurries where the particulates are uncoated, whereas currently available resin coated materials produce crosslink times with a difference of nearly sixty-five percent from the crosslink times in slurries where the particulates are uncoated.

The reduction in the degree of deviation in crosslink times indicates that resin coated particulates modified by the present invention are less interactive with the additives comprising hydraulic fracturing fluids. Therefore, the particulates manufactured through the present invention are considerably more beneficial to the petroleum production industry than conventional particles because they eliminate a source of variability in establishing the performance of hydraulic fracturing fluids. Furthermore, the inventors believe the particulates produced by the present invention will also prove beneficial in other oilfield well completion methods where resin coated particulates are placed in completion fluids, such as in gravel packing operations.

In a further test, the inventors compared fracturing fluids containing oxidative breakers and commercially available resin coated particulates to fracturing fluids containing oxidative breakers and coated particulates incorporating the present invention. Qualitative observations indicate that proppant packs composed of particulates practicing the present invention are less interactive and produce stronger packs than those proppant packs produced with particulates not incorporating the present invention.

For use in the petroleum production industry, the free-flowing, heat curable particulates of the present invention produced according to one of the preceding methods may be used as proppants in hydraulic fracturing operations or as gravel in gravel packed well completions. The specifics of gravel packing operations are well known in the hydrocarbon production industry. For example, particular operations are disclosed in the reference of: Allen, Thomas O. and Roberts, Alan P.; *Production Operations—Well Completions, Workover, and Stimulation*: Vol. 2, Chap. 4, pg. 67-94; Oil & Gas Consultants International, Inc., Tulsa, Okla. (1979). One such gravel packing operation employing particulates of the present invention places specially sized particulates in the wellbore, generally in the annular region, between the formation and a wire wrapped porous mandrel. The specially sized particulates produced using the methods of the present invention are placed in the annular region and specially sized to prevent the production of formation solids during the production of formation fluids. The wire wrapped porous mandrel is used to prevent the migration of the specially sized particulates into the subsurface and surface production equipment while allowing the production of hydrocarbons.

Hydraulic fracturing operations are also well known in the petroleum production industry. Examples may be found in the above cited references of *Recent Advances in Hydraulic Fracturing and Reservoir Stimulation*. In hydraulic fracturing operations using the resin coated particulates of the present invention, highly viscous fluids are used to initiate and propagate fractures in hydrocarbon bearing subterranean formations. These "frac fluids" are also used to convey the particulates of the present invention. Those particulates are used to "prop" the fracture open once the fracturing fluid has lost it high viscosity and has been recovered via the wellbore. Before the "frac fluids" are removed, however, the resin coatings on the particulates of the present invention are caused to be fused and cured into a highly permeable "proppant pack." The "frac fluids" are removed in order to make space available in the newly formed highly permeable "proppant pack" so that the production of hydrocarbons or the injection of hydrocarbon displacing fluids, whichever is preferred, is enhanced.

Additionally, it is well known in the petroleum production industry that crosslinkers are added as liquids or slowly soluble particulates to polymer solutions to create crosslinked fracturing and gravel packing solutions. These crosslinking agents have been variously described as metal chelates or metal compounds not containing a formaldehyde source. It, therefore, is another use of the methods of the present invention to affix these nonformaldehyde sourcing metal compounds to the surface of the particulates, whether resin coated or not so long as they are suitable as a propping agents in hydraulic fracturing operations or as a gravel in gravel packed well completions. The crosslinkers are affixed by direct application to the surface of particulates suitable as proppants, or by using any one of the previously described processes of the present invention, so that they may be available to affect polymer solution crosslinking. Polymers suitable for crosslinking include, but are certainly not limited to, guar, derivitized guars, and derivitized cellulosics which are produced in a fashion well known to those skilled in the art. An example of such an agent affixed to the surface of the aforementioned particulates is ammonium titanium lactate which may be obtained from DuPont or Zirconium Technology Corporation of Midland, Tex.

From the foregoing description and illustration of the present invention, it is apparent that various modifications can be made by reconfigurations or combinations to produce similar results. It is, therefore, the desire of Applicants not to be bound by the description of this invention as contained in this specification, but to be bound only by the claims as appended hereto.

We claim:

1. A process of manufacturing, free-flowing particulates, useful as carrying-fluid compatible proppants in the hydraulic fracturing of subterranean formations and, likewise, as carrying-fluid compatible gravel in gravel-packed well completions, comprising the steps of:

heating particulate substrates to a temperature above the melting point of a heat curable resin;
adding said resin to said heated substrates;
mixing said resin said substrates; and then reacting said heated substrates and said resin with a formaldehyde source-metal compound (FS-MC) complex; and cooling said coated particulates.

2. The process according to claim 1, in which the mixing step further comprises mixing said resin and said substrates until said resin is dispersed over the surface of said substrates.

3. The process according to claim 2, in which the cooling step further comprises cooling said coated particulates to below 140° F.

4. The process according to claim 3, further comprising the step of adding a coupling agent to either said resin or said substrate or to both in order to enhance the strength of said coated particulates.

5. The process according to claim 4, in which said coupling agent comprises an organo-functional silane.

6. A process of manufacturing, free-flowing particulates, useful as carrying-fluid compatible proppants in the hydraulic fracturing of subterranean formations and, likewise, as a carrying fluid compatible gravel in gravel-packed well completions, comprising the steps of:

manufacturing a heat curable resole resin to contain a formaldehyde source-metal compound (FS-MC) complex;

heating particulate substrates to a temperature above the melting point of said resole resin;

adding said resole resin to said heated substrates;

mixing said resole resin containing said FS-MC complex and said heated substrates; and cooling said coated particulates.

7. The process according to claim 6, in which the mixing step further comprises mixing said resole resin containing said FS-MC complex and said substrates until said resole resin is dispersed over the surface of said substrates.

8. The process according to claim 7, in which the cooling step further comprises cooling said coated particulates to below 140° F.

9. The process according to claim 8, further comprising the step of adding a coupling agent to either said resole resin or said substrate or to both in order to enhance the strength of said coated particulates.

10. The process according to claim 9, in which said coupling agent comprises an organo-functional silane.

11. A process of manufacturing, free-flowing particulates, useful as carrying-fluid compatible proppants in the hydraulic fracturing of subterranean formations and, likewise, as carrying-fluid compatible gravel in gravel-packed well completions, comprising the steps of:

heating particulate substrates to a temperature above the melting point of a heat curable resole resin;

adding said resole resin to said heated substrates;

adding a formaldehyde source-metal compound (FS-MC) complex to said heated substrates and said resole resin concurrently with said resole resin or within the setting time of said resole resin;

mixing said resole resin, said heated substrates, and said FS-MC complex; and cooling said coated particulates.

12. The process according to claim 11, in which the mixing step further comprises mixing said resole resin, said substrates, and said FS-MC complex until said resole resin and said FS-MC complex is dispersed over the surface of said substrates.

13. The process according to claim 12, in which the cooling step further comprises cooling said coated particulates to below 140° F.

14. The process according to claim 13, further comprising the step of adding a coupling agent to either said resole resin or said substrate or to both in order to enhance the strength of said coated particulates.

15. The process according to claim 14, in which said coupling agent comprises an organo-functional silane.

* * * * *